United States Patent Office 2,838,493
Patented June 10, 1958

2,838,493

PREPARATION OF 9,11-OXIDO-STEROIDS

Robert P. Graber, Elizabeth, and Calvin Stewart Snoddy, Jr., Plainfield, N. J., assignors to Merck & Co., Inc., Rahway, N. J., a corporation of New Jersey No Drawing. Application January 5, 1955
Serial No. 480,054

5 Claims. (Cl. 260—239.55)

This invention relates to steroids and particularly to the preparation of $9\beta,11\beta$-oxido-steroids.

It has been proposed to prepare 21-esters of $9\alpha$-fluoro-4-pregnene-$11\beta,17\alpha,21$-triol-3,20-dione ($9\alpha$-fluoro-hydrocortisone) from the corresponding $9\alpha$-bromo-steroid by first reacting it with potassium acetate to form the corresponding 21-ester of $9\beta,11\beta$-oxido-4-pregnene-$17\alpha,21$-diol-3,20-dione and then treating this compound with hydrogen fluoride. The reaction with potassium acetate results in the formation of a large amount of impurities one of which is the 21-ester of 4-pregnene-$17\alpha,21$-diol-3, 11,20-trione. The eventual removal of these impurities, and particularly the 21-ester of 4-pregnene-$17\alpha,21$-diol-3,11,20-trione (cortisone), from the 21-ester of 9-fluoro-hydrocortisone involves a laborious and difficult separation technique and correspondingly results in relatively low yields.

An object of the invention is to produce $9\beta,11\beta$-oxido-steroids in relatively pure form without the formation of undesirable products. Another object of the invention is to produce $9\beta,11\beta$-oxido-steroids from the corresponding $9\alpha$-bromo-$11\beta$-hydroxy steroid in high yield. Other objects and the advantages of the invention will appear hereinafter.

In accordance with the invention $9\beta,11\beta$-oxido-steroids are produced by reacting a $9\alpha$-bromo-$11\beta$-hydroxy steroid with a strong base. This reaction substantially eliminates formation of the undesired 11-keto-steroid and results in an increase in yield of the desired $9\beta,11\beta$-oxido-steroid. By the term "strong base" is meant a substance which will exhibit a pH greater than about 10 when in an aqueous solution of one-tenth of one percent concentration at a temperature of approximately 27° C. The pH is conveniently measured on a Beckmann pH meter such as Model G.

Typical examples of suitable strong bases are alkali and alkaline earth metal alkoxides and hydroxides, alkali metal carbonates, and quarternary ammonium hydroxides. The alkoxides are preferably those containing from one to eight carbon atoms. Particular examples of strong bases are sodium methoxide, potassium-t-butoxide, potassium ethoxide, sodium hydroxide, potassium hydroxide, sodium ethoxide, tetramethyl ammonium hydroxide, tetraethyl ammonium hydroxide, methyltriethyl ammonium hydroxide, calcium isopropoxide, magnesium methoxide, magnesium hydroxide, barium hydroxide, barium methoxide, sodium carbonate, potassium carbonate, lithium carbonate, and barium ethoxide. It is necessary, to obtain maximum yield, to use approximately equimolar amounts of the strong base with a range of one to ten moles being preferred.

Any of the $9\alpha$-bromo-$11\beta$-hydroxy steroids, and particularly, the pregnanes and pregnenes may be converted to the corresponding $9\beta,11\beta$-oxido compound. The reaction is very effective with $9\alpha$-bromo-$11\beta$-hydroxy-4-pregnenes. The presence of various substituents in the steroid molecule such as 3,6 and/or 20 keto groups, 3,17,20 and/or 21 hydroxy groups, ring double bonds such as at the 4,5,6 and/or 16 positions, an 18 aldehydo group, and ethylenedioxy groups such as at the 3 and/or 20 positions, do not interfere with the reaction. A 21-ester group such as the acetate, propionate, formate, butyrate, benzoate, t-butyl-acetate, hemisuccinate and phenylacetate group also does not interfere with the reaction but is removed during the reaction. In certain cases it may be desirable to acylate the reaction product to convert the saponfied material back to the ester form. Typical examples of such compounds are $9\alpha$-bromo-4-pregnene - $11\beta$ - ol - 3 - one; $9\alpha$ - bromo - 4 - pregnene-$11\beta,17\alpha$ - diol - 3 - one; $9\alpha$ - bromo - 4 - pregnene - $11\beta$, 21 - diol - 3 - one; $9\alpha$ - bromo - 4 - pregnene - $11\beta,20\alpha$, 21 - triol - 3 - one; $9\alpha$ - bromo - 4 - pregnene - $11\beta$, $17\alpha,20,21$ - tetrol - 3 - one; $9\alpha$ - bromo - 4 - pregnene-$11\beta,17\alpha,20\beta,21$ - tetrol - 3 - one; $9\alpha$ - bromo - 4 - pregnene - $11\beta$ - ol - 3,20 - dione $9\alpha$ - bromo - 4 - pregnene-$11\beta,17\alpha$ - diol - 3,20 - dione; $9\alpha$ - bromo - 4 - pregnene-$11\beta,21$ - diol - 3,20 - dione (21-acetate and other 21 esters); $9\alpha$ - bromo - 4 - pregnene - $11\beta,17\alpha,21$ - triol-3,20 - dione; $9\alpha$ - bromo - 4 - pregnene - $11\beta,17\alpha,21$-triol - 3,20 - dione 21 - formate; $9\alpha$ - bromo - 4 - pregnene - $11\beta,17\alpha,21$ - triol - 3,20 - dione 21 - acetate; $9\alpha$ - bromo - 4 - pregnene - $11\beta,17\alpha,21$ - triol - 3,20-dione 21 - propionate; $9\alpha$ - bromo - 4 - pregnene - $11\beta$, $17\alpha,21$ - triol - 3,20 - dione 21 - butyrate; $9\alpha$ - bromo - 4-pregnene - $11\beta,17\alpha,21$ - triol - 3,20 - dione 21 - benzoate; $9\alpha$ - bromo - 4 - pregnene - $11\beta,17\alpha,21$ - triol - 3,20-dione 21 - t - butyl - acetate; $9\alpha$ - bromo - 4 - pregnene-$11\beta,17\alpha,21$ - triol - 3,20 - dione 21-hemisuccinate; $9\alpha$-bromo - 4 - pregnene - $11\beta,17\alpha,21$ - triol - 3,20 - dione 21 - phenylacetate; $9\alpha$ - bromo - 4 - pregnene - $11\beta$ - ol-3,6 - dione; $9\alpha$ - bromo - 4 - pregnene - $11\beta$ - ol - 3,6,-20 - trione; $9\alpha$ - bromo - 4 - pregnene - $11\beta,17\alpha$ - diol-3,6,20 - trione; $9\alpha$ - bromo - 4 - pregnene - $11\beta,17\alpha,21$-triol - 3,6,20 - trione; $9\alpha$ - bromo - 4 - pregnene - $11\beta$, 21 - diol - 3,6,20 - trione; $9\alpha$ - bromo - 4 - pregnene-$6\alpha,11\beta$ - diol - 3,20 - dione; $9\alpha$ - bromo - 4 - pregnene-$6\beta,11\beta$ - diol - 3,20 - dione; $9\alpha$ - bromo - 4 - pregnene-$4,11\beta$ - diol - 3,20 - dione; $9\alpha$ - bromo - 4 - pregnene-$4,11\beta,17\alpha$-triol - 3,20 - dione; $9\alpha$-bromo - 4 - pregnene-$4,11\beta,17\alpha,21$ - tetrol - 3,20 - dione; $9\alpha$ - bromo - 4-pregnene - $11\beta,17\alpha,21$ - triol - 3,6,20 - trione 21 - acetate; $9\alpha$ - bromo - 4 - pregnene - $4,11\beta,17\alpha,21$ - tetrol - 3,20-dione, 4,21 - diacetate; $9\alpha$ - bromo - 4 - pregnene - $11\beta$-ol - 3 - one; $9\alpha$ - bromo - 4 - pregnene - $11\beta,17\alpha$ - diol-3 - one; $9\alpha$ - bromo - 4 - pregnene - $11\beta$ - ol - 3,20-dione; $9\alpha$ - bromo - pregnene - $11\beta,17\alpha$-diol - 3,20 - dione; $9\alpha$ - bromo - pregnane - $11\beta,17\alpha,21$ - triol - 3,20 - dione; $9\alpha$ - bromo - pregnane - $11\beta,21$ - diol - 3,20 - dione; $9\alpha$-bromo - pregnane - $11\beta,17\alpha,21$ - triol - 3,20 - dione 21-acetate; $9\alpha$ - bromo - pregnane - $11\beta,21$ - diol - 3,20-dione 21 - acetate (and 21 - esters); $9\alpha$ - bromo - pregnane - $3\alpha,11\beta,17\alpha,21$ - tetrol - 20 - one; $9\alpha$ - bromo-pregnane - $3\alpha,11\beta$, $17\alpha$, 21- tetrol - 20 - one 21-acetate; $9\alpha$-bromo - 5 - pregnene - $3\beta$, $11\beta$ - diol - 20 - one; $9\alpha$-bromo - 5 - pregnene - $3\beta,11\beta,17\alpha,21$ - tetrol - 20 - one; $9\alpha$ - bromo - 5 - pregnene - $3\beta,11\beta,17\alpha,21$ - tetrol - 20-one 3,21-diacetate; $9\alpha$ - bromo - 5 - pregnene - $3\alpha,11\beta$-diol - 20 - one; $9\alpha$ - bromo - 3 - ethylenedioxy - 5 - pregnene - $11\beta,17\alpha,21$ - triol - 20 - one; $9\alpha$ - bromo - 3,3-dimethoxy - 5 - pregnene - $11\beta,17\alpha,21$ - triol - 20 - one 21-acetate; $9\alpha$ - bromo - allo pregnane - $11\beta,17\alpha$,diol - 3,20-dione; $9\alpha$ - bromo - allo pregnane - $11\beta,21$ - diol - 3,20-dione; $9\alpha$ - bromo - allo pregnane - $11\beta,17\alpha,21$ - triol-3,20 - dione; $9\alpha$ - bromo - allo-pregnane - $3\alpha,11\beta,17\alpha$, 21 - tetrol - 20 - one; $9\alpha$ - bromo - allo pregnane - 3,20-dione.

The reaction is preferably carried out in an organic solvent and one in which the steroids are relatively soluble. The preferred solvent is an alkanol containing from one to eight carbon atoms. When an alkoxide is used the alkanol carbon chain is preferably the same. Other solvents can be used, such as chloroform, ethylenedichloride, tetrahydrofuran and dioxane, to increase the solubility of the steroid. When the hydroxides or carbonates are used it may be desirable to use aqueous mixtures to increase the solubility of the base.

The preferred temperature of the reaction is about normal room temperature (20–30° C.) although higher and lower temperatures can be utilized such as from 0° to 40° C. The reaction proceeds quite rapidly at room temperature requiring only about one to thirty minutes. The product is conveniently recovered by the addition of an acid such as glacial acetic acid to neutralize the remaining base, and then concentrating or diluting the mixture with water. The product is extracted from the resulting mixture with an organic solvent, as for example, chloroform. The product can also be precipitated by the addition of water and removed by filtration.

The following examples are given for the purpose of illustration:

EXAMPLE 1

*9β,11β-oxido-4-pregnene-17α,21-diol - 3,20 - dione 21-acetate*

A mixture of 236 ml. of tetrahydrofuran and 38.0 g. (0.0787 mole) of 9α-bromo-4-pregnene-11β,17α,21-triol-3,20-dione 21-acetate is stirred at 24° C. for 30 minutes to effect a homogeneous solution. To the solution is added 320 ml. of absolute methanol and to a separatory funnel 985 ml. of 0.0984 N sodium methoxide in absolute methanol (1.23 moles per mole of bromohydrin). The system is purged three times with nitrogen and left under a slight positive nitrogen pressure. To the mixture in the flask is added the sodium methoxide solution with stirring over a period of ¾ min. Stirring is continued for 4¼ minutes additional. At the end of this time the excess sodium methoxide is destroyed with 55 ml. of glacial acetic acid. A condenser is then attached to the reactor and the mixture concentrated to 100 ml. in vacuo at 10–15° C. To the mixture is added 320 ml. of water and 800 ml. of chloroform. The layers are separated and the water layer extracted twice with 250 ml. portions and twice with 100 ml. portions of chloroform. The last extraction is aided by salting out the water layer with 75 g. of sodium chloride and the last chloroform extract is used to backwash all subsequent aqueous washing which comprised the following portions; 100 ml. of water, twice with 250 ml. portions of 5% sodium bicarbonate, and then 100 ml. portions of water. The chloroform layer is filtered through anhydrous magnesium sulfate, concentrated to dryness in vacuo and the residue treated with 85 ml. of pyridine and 85 ml. of acetic anhydride. The mixture is allowed to stand overnight, then concentrated in vacuo to a thick paste to which is added 300 g. of ice and 100 ml. of ethyl acetate. After stirring for one hour 420 ml. of ethyl acetate is added to extract the water layer. The water layer is extracted twice with 100 ml. portions and twice with 80 ml. portions of ethyl acetate. The ethyl acetate extracts are combined, washed with water, diulte acid, water, 5% sodium bicarbonate, water and saturated salt solution and filtered through anhydrous magnesium sulfate. The filtrate is concentrated to dryness in vacuo to produce crystalline material.

EXAMPLE 2

*9β,11β-oxido-4-pregnene-17α,21-diol - 3,20 - dione 21-acetate*

A solution consisting of 0.483 g. (one millimole) of 9α-bromo-4-pregnene-11β,17α,21-triol-3,20-dione 21-acetate, 3.0 ml. of tetrahydrofuran and 1.0 ml. of t-butanol is purged four times with nitrogen. The solution is stirred while adding 1.01 ml. of 1.09 N potassium t-butoxide in t-butanol. The addition of butoxide turned the mixture immediately to a bright pink. The mixture is stirred ten minutes at 25° C. and then quenched with 0.1 ml. of glacial acetic acid which turned the color light amber. The mixture is then concentrated to dryness in vacuo. The residue is flushed twice with 3 ml. portions of chloroform. A 3 ml. portion of acetic anhydride is added to the residue after warming with 3 ml. of pyridine and cooling to 25° C. and the mixture allowed to stand overnight. The mixture is concentrated to dryness in vacuo and the residue dissolved with stirring in 20 ml. of chloroform and 10 ml. of water. The stirring is continued for one hour to decompose any traces of acetic anhydride. After separating the layers the aqueous phase is extracted with 5 ml. and 3 ml. portions of chloroform. The combined chloroform phases are extracted with 0.125 N hydrochloric acid, water, 5% sodium bicarbonate and again with water, and filtered through anhydrous magnesium sulfate. The solution is evaporated to dryness, to afford the crystalline product.

EXAMPLE 3

*9β,11β-oxido-4-pregnene-17α,21-diol - 3,20 - dione 21-acetate*

Using the method of Example 2 a 0.483 g. sample of 9α-bromo-4-pregnene-11β,17α,21-triol-3,20-dione 21-acetate is reacted with a solution of potassium hydroxide in methanol for a period of six minutes. The product is recovered as in Example 2 and it gave a single spot on paper chromatography indicating the presence of the desired product.

EXAMPLE 4

*9β,11β-oxido-4-pregnene-17α,21-diol-3,20-dione 21-acetate*

A mixture of 19.80 g. of 9α-bromo-4-pregnene-11β,17α,21-triol-3,20-dione 21-acetate and 791 ml. of tetrahydrofuran was stirred at 25–30° C. until solution was complete. To this solution was added with stirring a solution of 6.01 g. of potassium carbonate in 465 ml. of water. The mixture was stirred and the temperature was maintained at 25–30° C. for eight hours. Then 2.0 ml. of glacial acetic acid was added to neutralize the excess base. The mixture was concentrated in vacuo to ca. 500 ml. and 500 ml. of water was added to the resulting slurry of crystalline material. The slurry was stirred and cooled to 0–5° C. for one-half hour. The solid product was removed by filtration, washed free of bromide ion with water and dried, M. P. 196–199°. This product was shown by paper strip chromatography to be free of the starting material and to contain substantially no cortisone acetate.

EXAMPLE 5

*9β,11β-oxido-4-pregnene-17α,21-diol-3,20-dione*

A 1.0 g. sample of 9α-bromo-4-pregnene-11β,17α,21-triol-3,20-dione is treated with a solution of barium hydroxide in methanol as described in Example 3. The product is substantially free of cortisone.

Any departure from the above description, which conforms to the present invention, is intended to be included within the scope of the claims.

What is claimed is:

1. The process which comprises reacting a 9α-bromo-11β-hydroxy-steroid selected from the group consisting of the pregnanes, allopregnanes, and unsaturated pregnane compounds, with a strong base having a pH greater than 10 in 0.1 percent aqueous solution to produce the corresponding 9β,11β-oxido compound.

2. The process of claim 1 wherein the strong base is a hydroxide.

3. The process of claim 1 wherein the strong base is an alkoxide.

4. The process of claim 1 wherein the strong base is a carbonate.

5. A process which comprises reacting a 21-acyloxy derivative of 9α-bromo-4-pregnene-11β,17α,21-triol-3,20-dione wherein the acyloxy group has the formula

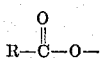

wherein R is a hydrocarbon group containing from one to eight carbon atoms with a strong base having a pH greater than 10 in 0.1 percent aqueous solution to produce 9β,-11β-oxido-4-pregnene-17α,21-diol-3,20-dione.

References Cited in the file of this patent

UNITED STATES PATENTS

| 2,503,842 | Reichstein | Apr. 11, 1950 |
| 2,703,799 | Bergstrom | Mar. 8, 1955 |
| 2,705,711 | Dodson | Apr. 5, 1955 |

OTHER REFERENCES

Cornforth: "Chem. and Ind.," Aug. 29, 1953, pp. 919–20. (Copy in Pat. Off. Lib.)